United States Patent
Li et al.

(10) Patent No.: US 10,098,154 B2
(45) Date of Patent: Oct. 9, 2018

(54) METHOD AND APPARATUS FOR DETECTION AND RESOLUTION OF RESOURCE COLLISION IN A PEER-TO-PEER NETWORK

(75) Inventors: Junyi Li, Chester, NJ (US); Xinzhou Wu, Monmouth Junction, NJ (US); Sundar Subramanian, Somerville, NJ (US); Nilesh Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 12/832,808

(22) Filed: Jul. 8, 2010

(65) Prior Publication Data
US 2012/0008571 A1    Jan. 12, 2012

(51) Int. Cl.
| | | |
|---|---|---|
| H04W 74/08 | (2009.01) | |
| H04W 76/11 | (2018.01) | |
| H04W 76/02 | (2009.01) | |
| H04W 84/18 | (2009.01) | |

(52) U.S. Cl.
CPC ...... *H04W 74/0825* (2013.01); *H04W 76/021* (2013.01); *H04W 76/11* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 7,899,073 B2 | 3/2011 | Laroia et al. | |
| 7,986,698 B2 | 7/2011 | Li et al. | |
| 8,072,917 B2 | 12/2011 | Wu et al. | |
| 2005/0254449 A1 | 11/2005 | Halfmann et al. | |
| 2007/0058544 A1* | 3/2007 | Kim et al. | 370/230 |
| 2009/0013219 A1 | 1/2009 | Laroia et al. | |
| 2009/0016219 A1* | 1/2009 | Laroia et al. | 370/231 |
| 2009/0016231 A1* | 1/2009 | Li | H04L 5/0007 370/252 |
| 2009/0016311 A1* | 1/2009 | Wu | H04W 8/186 370/342 |
| 2009/0019113 A1* | 1/2009 | Wu | H04L 12/1881 709/204 |
| 2009/0019168 A1* | 1/2009 | Wu | H04L 5/0048 709/228 |

(Continued)

FOREIGN PATENT DOCUMENTS

| | | |
|---|---|---|
| JP | 2007500988 A | 1/2007 |
| WO | WO-2004103009 A1 | 11/2004 |

(Continued)

OTHER PUBLICATIONS

International Search Report and Written Opinion—PCT/US2011/043232—ISA/EPO—dated Nov. 7, 2011.

*Primary Examiner* — Nicholas Sloms
(74) *Attorney, Agent, or Firm* — Arent Fox, LLP

(57) ABSTRACT

A method of operating a wireless device includes selecting a connection identifier with a first node, receiving a scheduling control signal on a resource associated with the connection identifier, and determining a presence of a second node transmitting on the same resource associated with the connection identifier based on the received scheduling control signal.

37 Claims, 12 Drawing Sheets

(56) References Cited

U.S. PATENT DOCUMENTS

| | | | |
|---|---|---|---|
| 2009/0019169 A1* | 1/2009 | Li | .................... H04L 5/0007 709/228 |
| 2009/0061922 A1 | 3/2009 | Ergen et al. | |
| 2009/0109851 A1* | 4/2009 | Li | .................... H04W 72/1231 370/235 |
| 2009/0168722 A1 | 7/2009 | Saifullah et al. | |
| 2010/0035626 A1 | 2/2010 | Iwamoto | |
| 2010/0085973 A1* | 4/2010 | Li | .................... H04W 72/02 370/395.3 |

FOREIGN PATENT DOCUMENTS

| | | |
|---|---|---|
| WO | 2009009390 A1 | 1/2009 |
| WO | 2009009608 A2 | 1/2009 |
| WO | 2009009614 A2 | 1/2009 |
| WO | WO2009009384 | 1/2009 |
| WO | WO-2009009402 | 1/2009 |
| WO | 2009059154 A1 | 5/2009 |
| WO | 2009/112080 A1 | 9/2009 |
| WO | 2009114273 A1 | 9/2009 |
| WO | WO-2009114272 A2 | 9/2009 |
| WO | 2009/148410 A1 | 12/2009 |
| WO | WO-2010053851 | 5/2010 |
| WO | WO-2010054101 | 5/2010 |

* cited by examiner

METHOD AND APPARATUS FOR DETECTION AND RESOLUTION OF RESOURCE COLLISION IN A PEER-TO-PEER NETWORK

BACKGROUND

Field

The present disclosure relates generally to communication systems, and more particularly, to detection and resolution of resource collision in a peer-to-peer network.

Background

In a time slotted ad-hoc network (such as FlashLinQ) with communication links arriving and departing in an arbitrary manner, a resource such as a connection identifier (CID) is assigned to a link in order for a peer in the link to signal the link's presence to other links and to participate in a common contention resolution phase. Thus, it is important for two links not to use the same CID resource unless they are sufficiently far apart (i.e., they do not interfere with each other's signaling). However, if links that share the same CID resource move closer to each other or a link has no choice but to choose a CID resource used by a nearby link, the links may experience a CID collision. In FlashLinQ, a CID collision may be detected within one second or longer of the CID collision. However, there is a need for a faster method for detecting CID collisions.

SUMMARY

In an aspect of the disclosure, a method of operating a wireless device is provided in which a CID is selected with a first node. In addition, a scheduling control signal is received on a resource associated with the CID. Furthermore, a presence of a second node transmitting on the same resource associated with the CID is detected based on the received scheduling control signal.

In an aspect of the disclosure, a method of operating a wireless device is provided in which a CID is selected with a first node. In addition, a data confirmation signal is received on a resource associated with the CID. Furthermore, a presence of a second node transmitting on the same resource associated with the CID is detected based on the received data confirmation signal.

DETAILED DESCRIPTION

Figure 1:
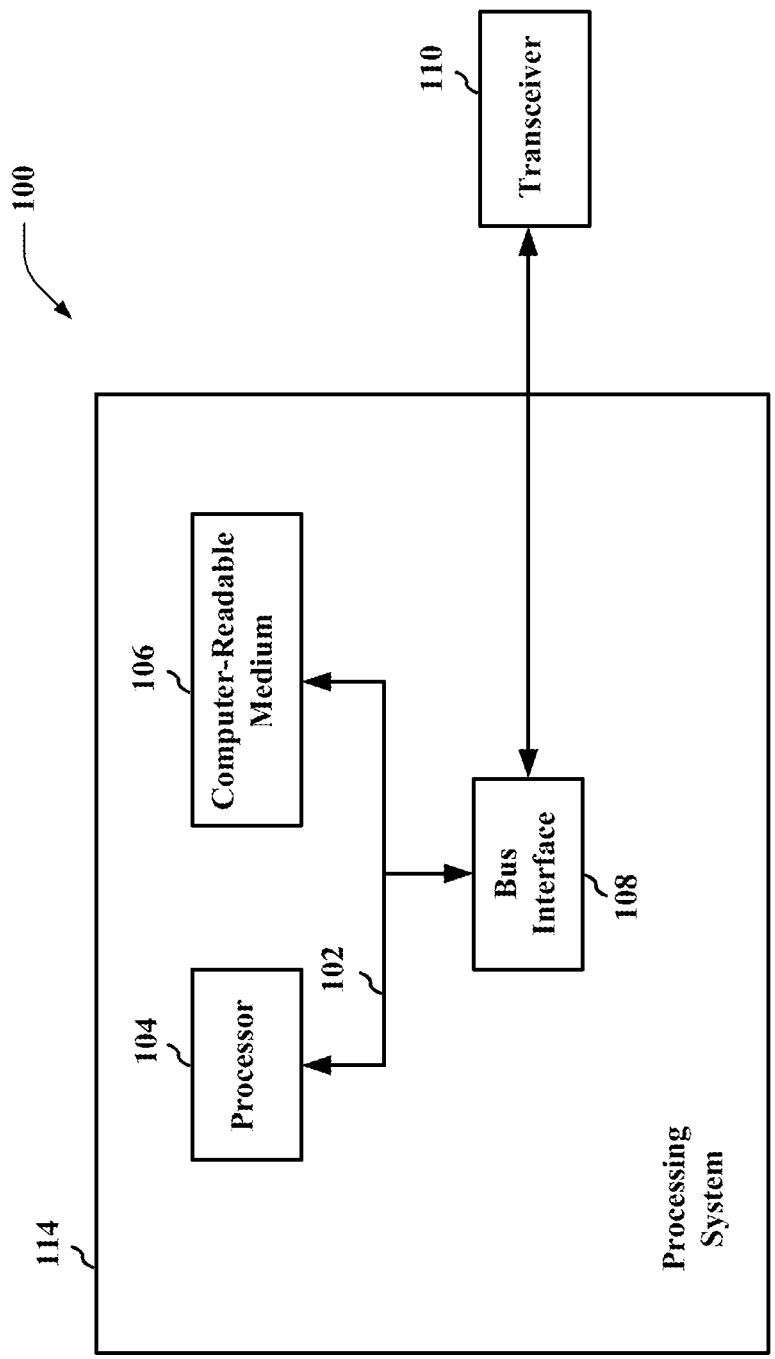
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
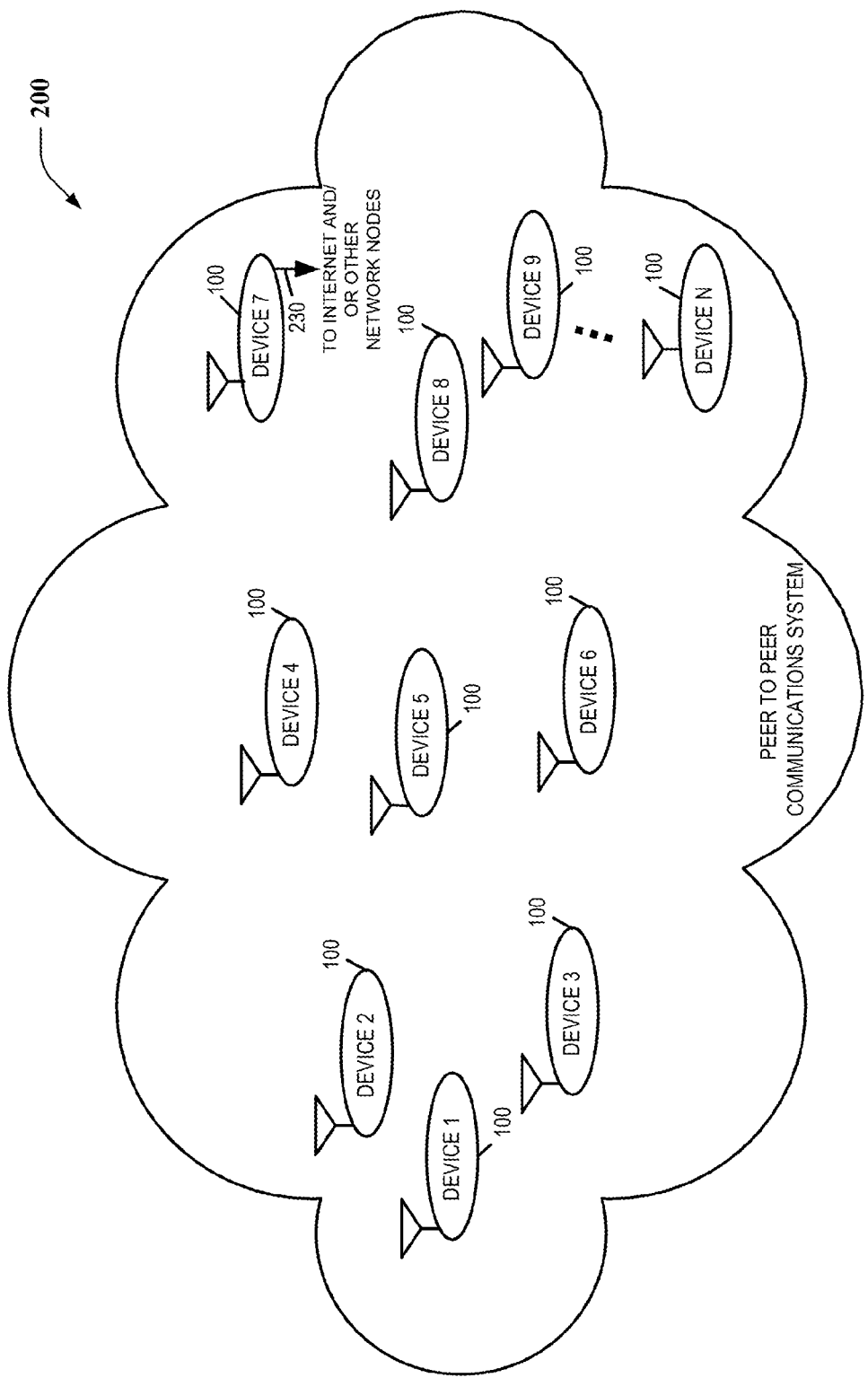
FIG. 2 is a drawing of an exemplary wireless peer-to-peer communications system.

FIG. 2 is a drawing of an exemplary wireless peer-to-peer communications system 200. The wireless peer-to-peer communications system 200 includes a plurality of wireless communications devices 100. Some of the wireless communications devices 100, such as device 7, for example, include an interface 230, to the Internet and/or other network nodes. Some of the wireless communications devices 100 may be mobile wireless communication devices such as handheld mobile devices. The wireless communications devices 100 support direct peer-to-peer communications.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ in relation to FIGS. 3, 4, 5, 6A, and 6B. However, one of ordinary skill in the art would understand that the exemplary methods and apparatuses are applicable more generally to a variety of other wireless peer-to-peer communication systems.

Figure 3:
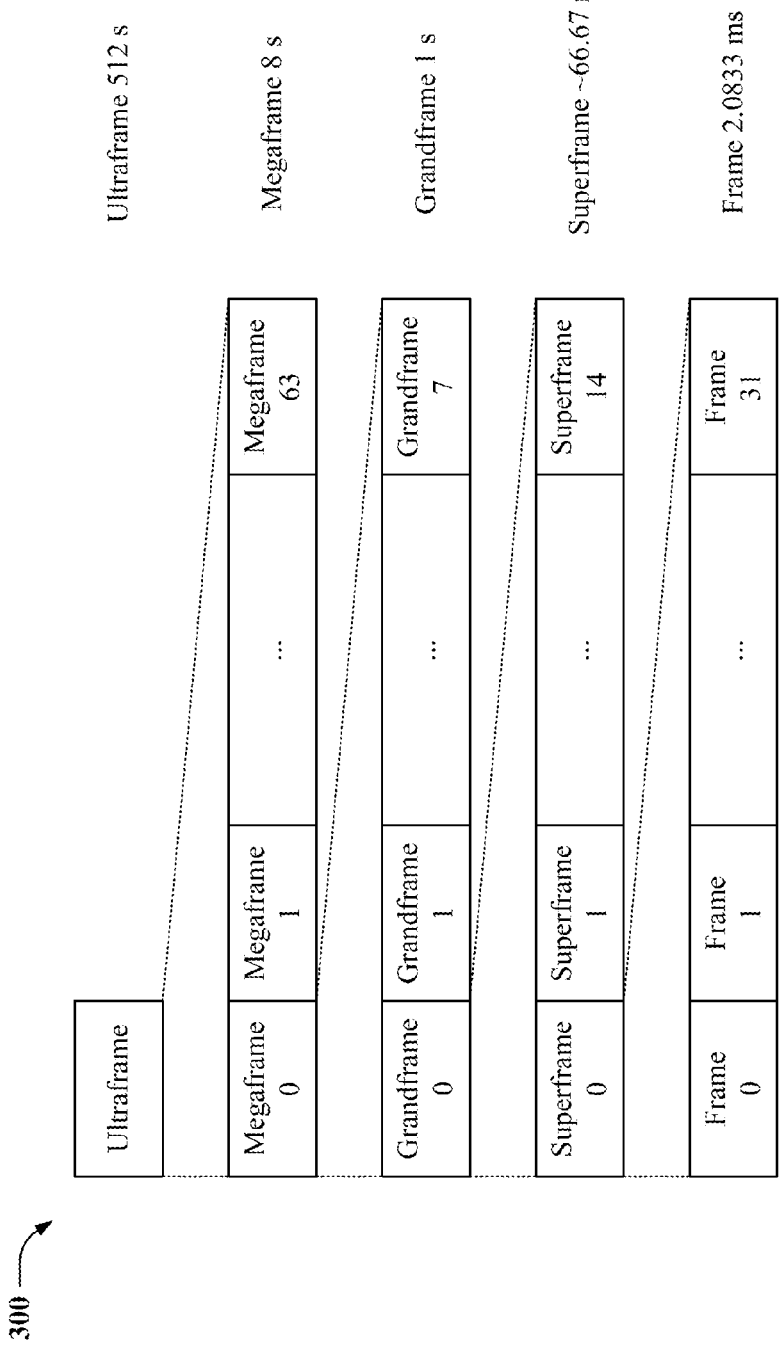
FIG. 3 is a diagram illustrating a time structure for peer-to-peer communications between the wireless communication devices.

FIG. 3 is a diagram 300 illustrating a time structure for peer-to-peer communications between the wireless communication devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
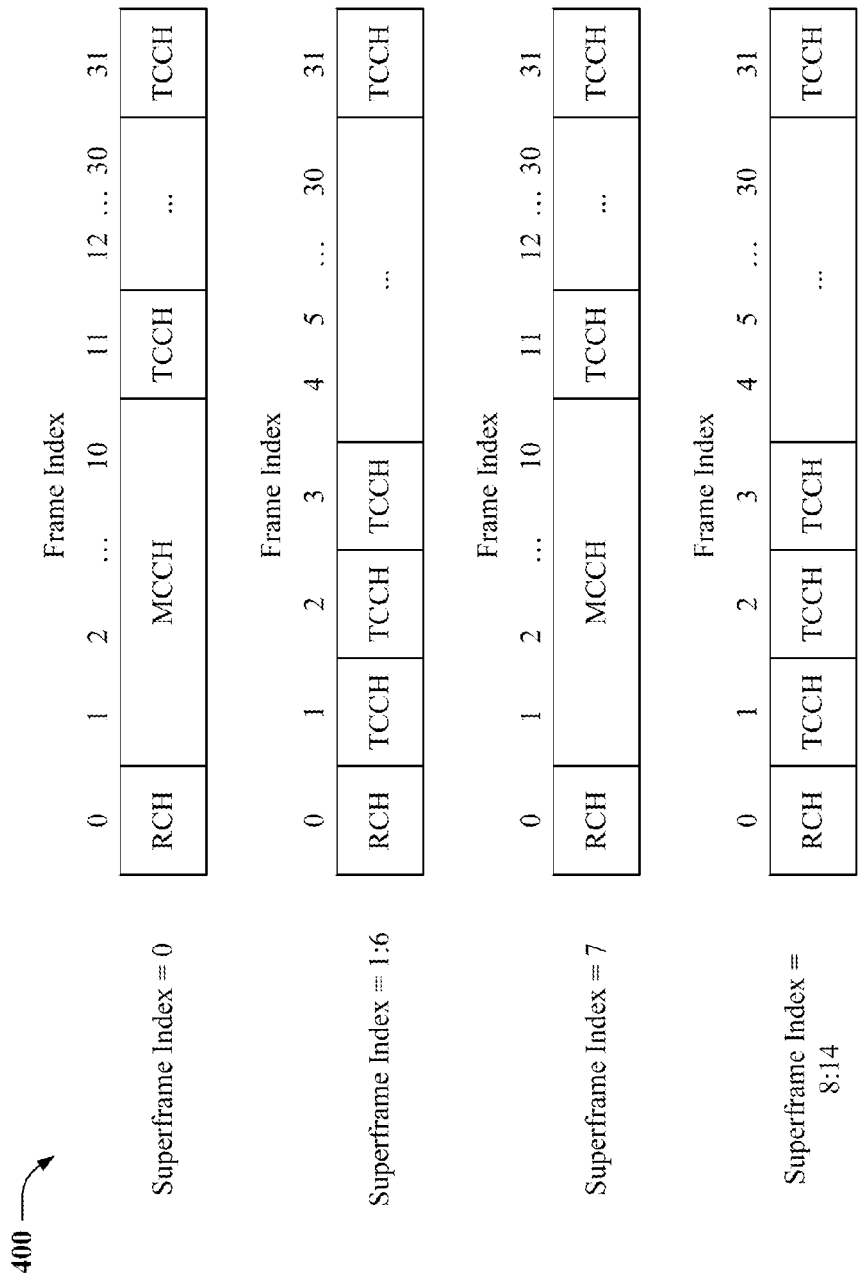
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
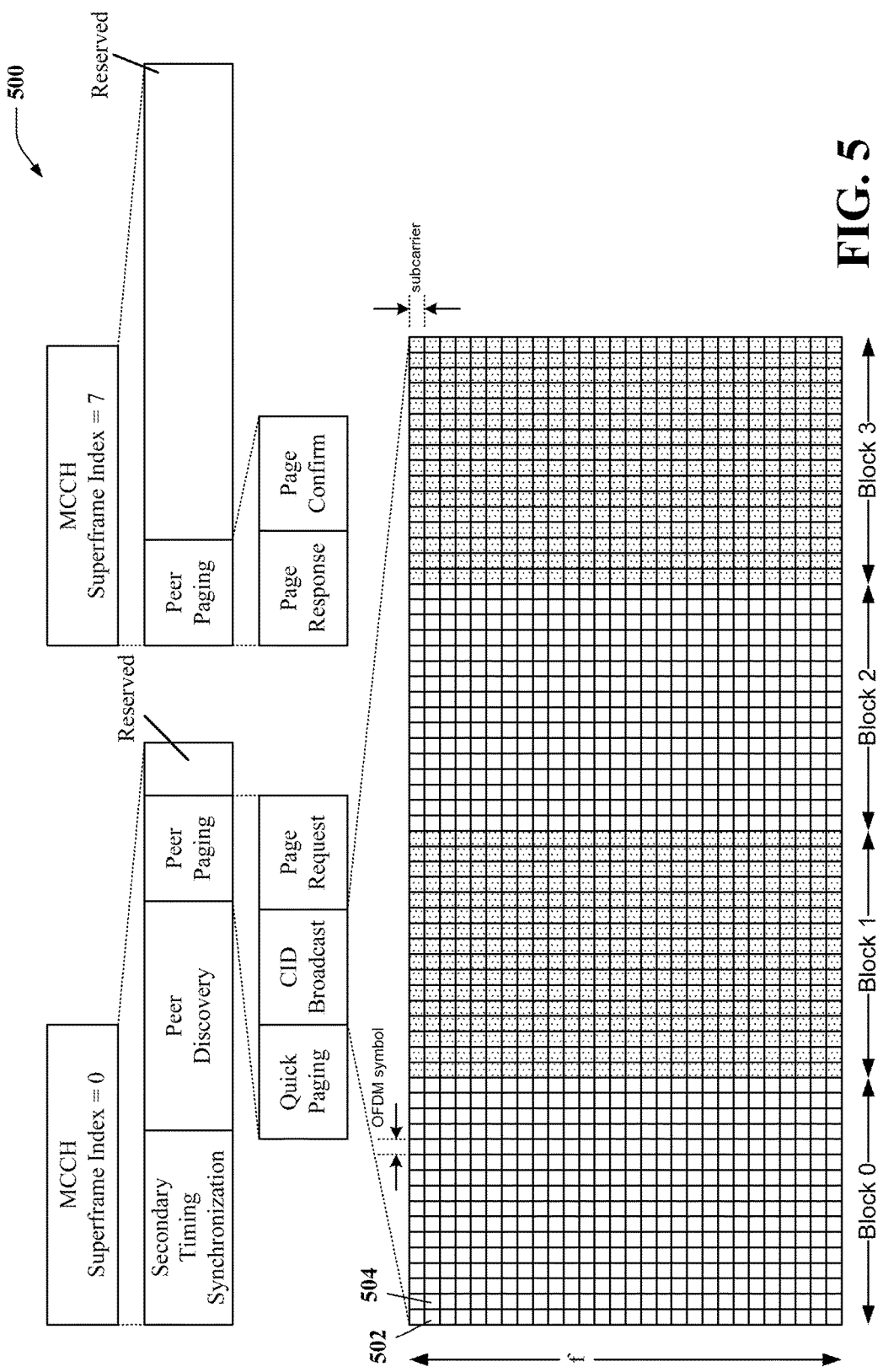
FIG. 5 is a diagram illustrating an operation timeline of a miscellaneous channel and a structure of the CID broadcast.

FIG. 5 is a diagram 500 illustrating an operation timeline of the MCCH and a structure of the CID broadcast. As discussed in relation to FIG. 4, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless node evidence that its link connection with a communication peer still exists.

The structure of the CID broadcast consists of four blocks, each of which contains a plurality of resource elements, i.e., a plurality of subcarriers in the frequency domain and orthogonal frequency divisional multiplexing (OFDM) symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of adjacent resource elements is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless node that initiated the link randomly selects a block from Block 0 and Block 2 for the CID broadcast and the other wireless node in the link randomly selects a block from Block 1 and Block 3 for the CID broadcast. As such, for a particular CID, only half of the allocated resources are utilized by a link with that CID. Due to the random selection of a block, a first wireless node in a link with a second wireless node will be able to detect a CID collision when a third wireless node or a fourth wireless node in a different link transmits a CID broadcast using a block different than the block selected by the first wireless node or the second wireless node.

For example, assume a wireless node with a CID=4 selects Block 0 for the CID broadcast. The wireless node may be allocated resource elements 502, 504 for the CID broadcast. In resource element 502, the wireless node transmits an energy proportional to a power used to transmit in the TCCH. In resource element 504, the wireless node transmits an energy inversely proportional to a power received in the TCCH. In a subsequent grandframe, the wireless node may have a different pair of resource elements with a different subcarrier, but the same relative OFDM symbol position (i.e., in this example, the first and the second OFDM symbol of the selected block).

Figure 6:
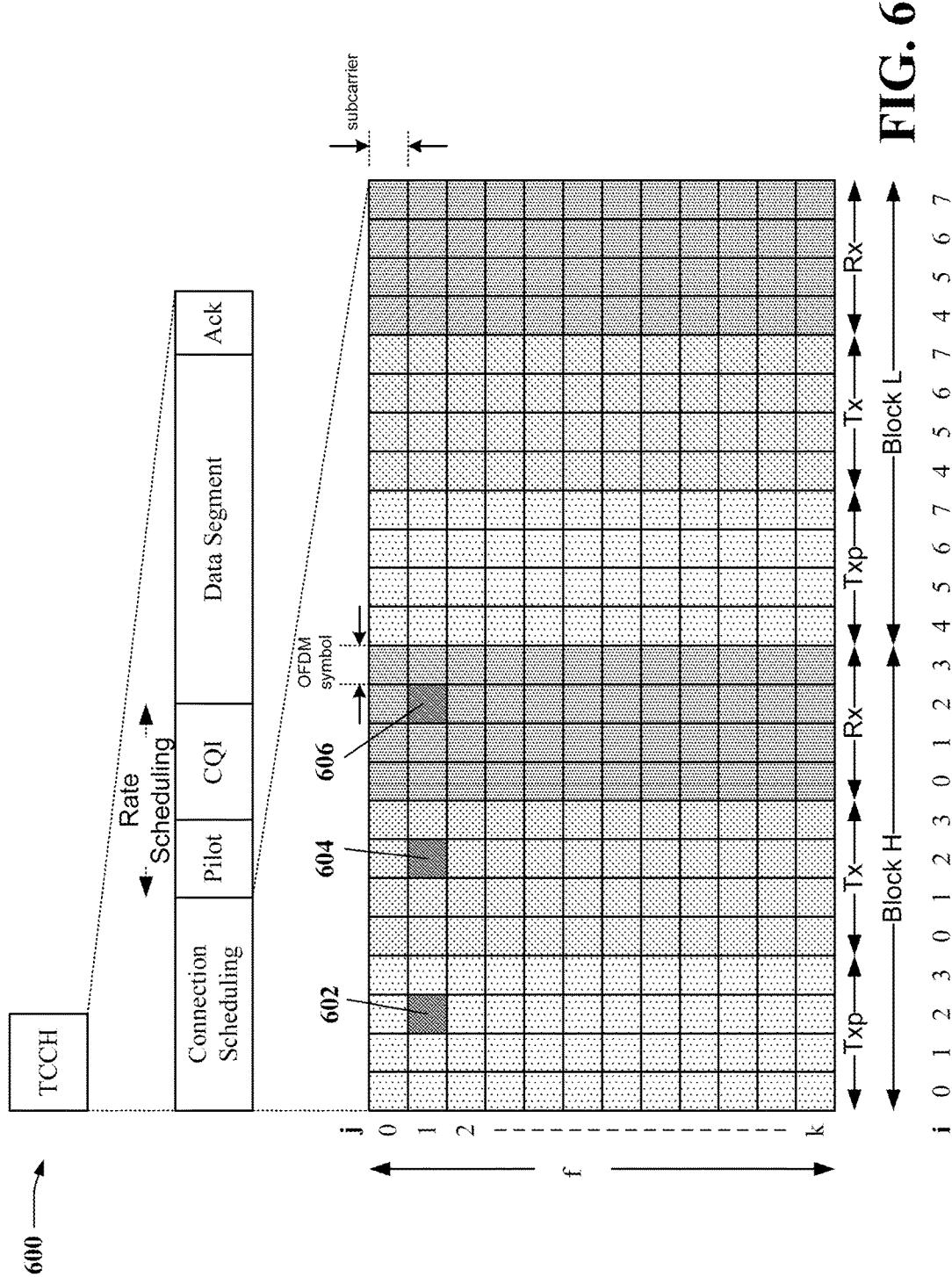
FIG. 6 is a diagram illustrating an operation timeline of a traffic channel slot and a structure of link scheduling.

FIG. 6 is a diagram 600 illustrating an operation timeline of a TCCH slot and a structure of link scheduling. As shown in FIG. 6, a TCCH slot includes four subchannels: connection scheduling, rate scheduling, data segment, and ACK. The rate scheduling subchannel includes a pilot segment and a CQI segment. The ACK subchannel is for transmitting a hybrid automatic repeat request (HARM) acknowledgment (ACK) or negative acknowledgement (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless nodes in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 602 in the Txp-block of Block H, the resource element 604 in the Tx-block of Block H, and the resource element 606 in the Rx-block of Block H. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 602, 604, 606 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 602, 604, 606 correspond to a medium access priority of 58.

Figure 7B:
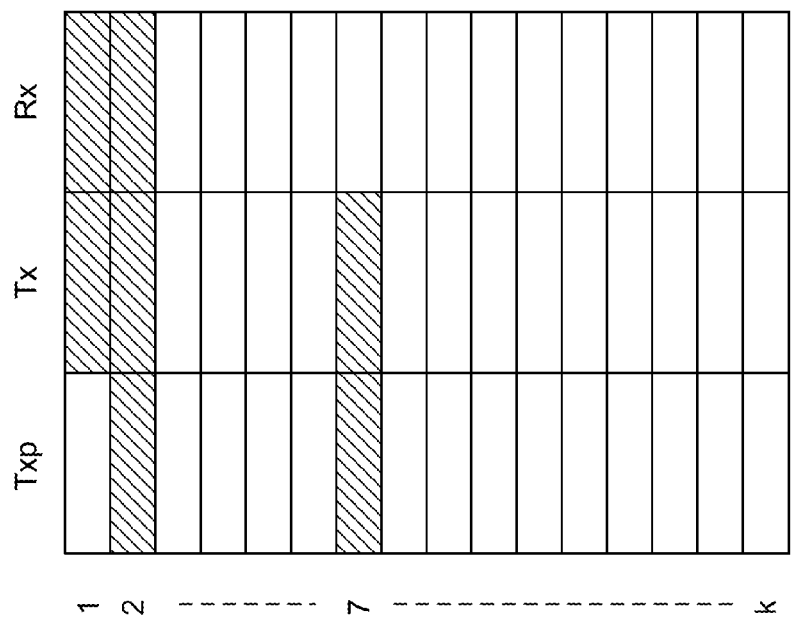
FIG. 7B is a second diagram for illustrating an exemplary connection scheduling signaling scheme for the wireless communications devices.
Figure 7A:
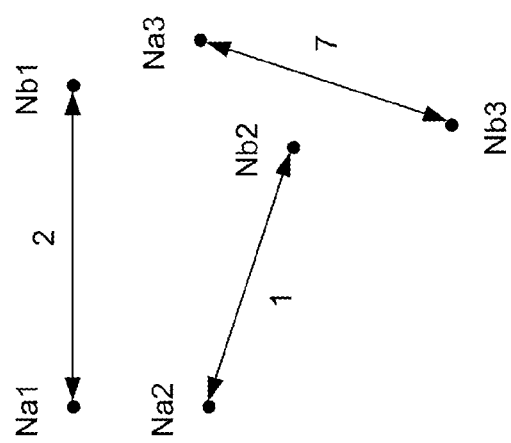
FIG. 7A is a first diagram for illustrating an exemplary connection scheduling signaling scheme for the wireless communications devices.

FIG. 7A is a first diagram for illustrating an exemplary connection scheduling signaling scheme for the wireless communications devices 100. As shown in FIG. 7A, wireless node a1 (Na1) is communicating with wireless node b1 (Nb1), wireless node a2 (Na2) is communicating with wireless node b2 (Nb2), and wireless node a3 (Na3) is communicating with wireless node b3 (Nb3). The wireless node Na1 is assumed to have transmit priority over the wireless node Nb1, the wireless node Na2 is assumed to have transmit priority over the wireless node Nb2, and the wireless node Na3 is assumed to have transmit priority over the wireless node Nb3. Each of the links has a different medium access priority depending on the particular slot for communication. For the particular slot for communication, link 1 (Na1, Nb1) is assumed to have a medium access priority of 2, link 2 (Na2, Nb2) is assumed to have a medium access priority of 1, and link 3 (Na3, Nb3) is assumed to have a medium access priority of 7.

FIG. 7B is a second diagram for illustrating an exemplary connection scheduling signaling scheme for the wireless communications devices 100. FIG. 7B shows connection scheduling resources of first respective OFDM symbols (i=0, see FIG. 6) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequencies bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison. The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link All of the transmitters listen to the tones in the Rx-block to determine whether to Tx-yield.

The connection scheduling signaling scheme is best described in conjunction with an example. The node Na2 has no data to transmit and does not transmit in the Txp-block for medium access priority 1, the node Na1 has data to transmit and transmits in the Txp-block for medium access priority 2, and the node Na3 has data to transmit and transmits in the Txp-block for medium access priority 7. The node Nb2 has data to transmit and transmits in the Tx-block for medium access priority 1, the node Na1 transmits in the Tx-block for medium access priority 2, and the node Na3 transmits in the Tx-block for medium access priority 7. The node Na2 listens to the tones in the Tx-blocks and determines to transmit in the Rx-block for medium access priority 1, as the node Na2 has the highest priority. The node Nb1 listens to the tones in the Tx-blocks, determines that its link would not interfere with link 2, which has a higher medium access priority, and transmits in the Rx-block for medium access priority 2. The node Nb3 listens to the tones in the Tx-blocks, determines that its link would interfere with link 1 and/or link 2, both of which have a higher medium access priority, and Rx-yields by not transmitting in the Rx-block for medium access priority 7. Subsequently, both Nb2 and Na1 listen to the tones in the Rx blocks to determine whether to transmit the data. Because Nb2 has a higher link medium access priority than Na1, Nb2 transmits its data. Na1 will Tx-yield if Na1 determines that its transmission would interfere with the transmission from Nb2.

Figure 8A:
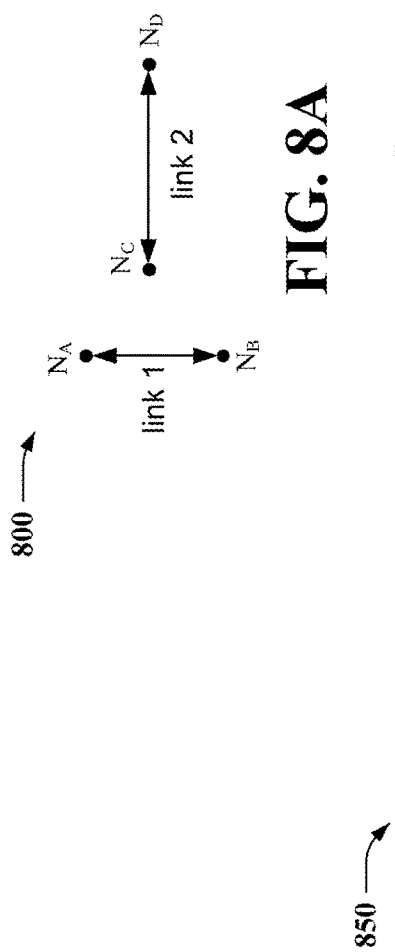
FIG. 8A is a first diagram for illustrating an exemplary method for detecting CID collisions.
Figure 8B:
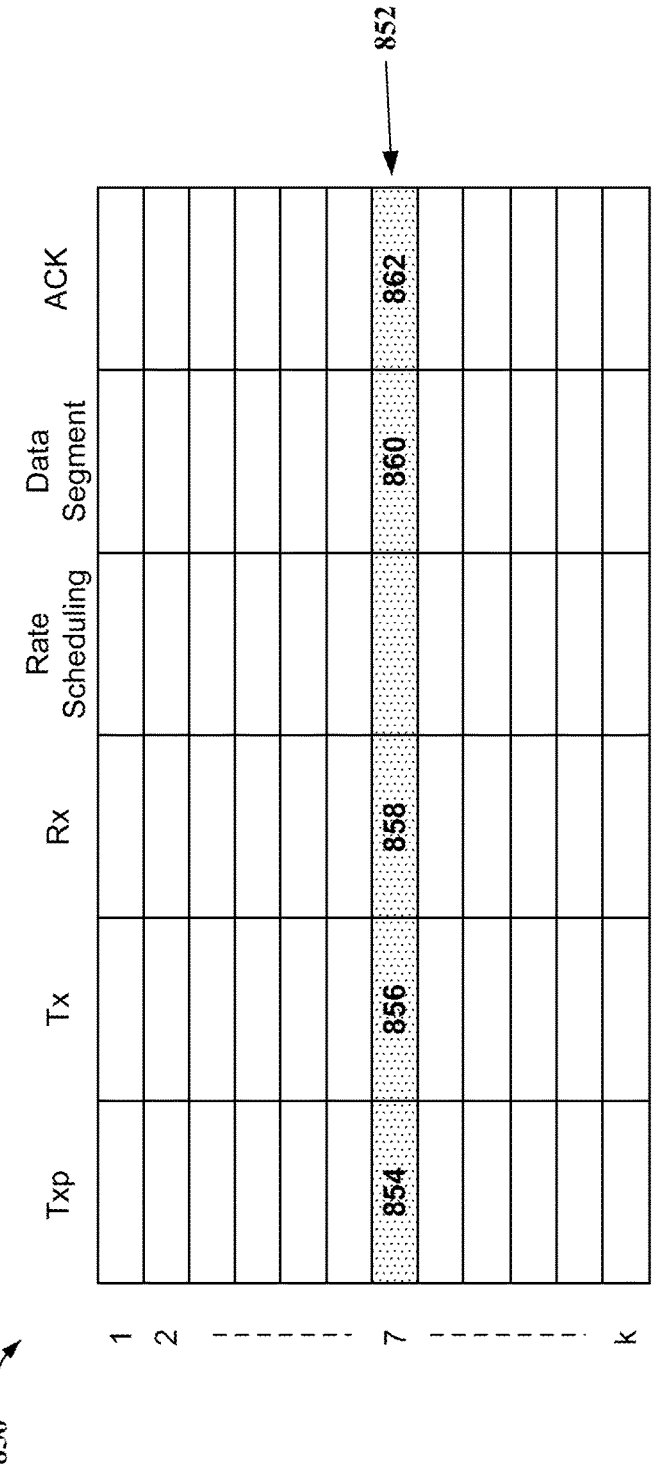
FIG. 8B is a second diagram for illustrating the exemplary method for detecting CID collisions.

FIG. 8A is a first diagram for illustrating an exemplary method for detecting CID collisions. FIG. 8B is a second diagram for illustrating the exemplary method for detecting CID collisions. As shown in FIG. 8A, in a first link (link 1), the wireless node $N_A$ with transmit priority is communicating with the wireless node $N_B$, and in a second link (link 2), the wireless node $N_C$ with transmit priority is communicating with the wireless node $N_D$. Assume both link 1 and link 2 have the same CID. As such, both link 1 and link 2 will utilize the same Txp, Tx, and Rx subblocks for connection scheduling. As illustrated in FIG. 8B, in a particular TCCH slot, link 1 and link 2 are both utilizing resources 852. According to an exemplary method, the wireless nodes $N_A$, $N_B$, $N_C$, and $N_D$ detect a CID collision when they detect an unexpected signal in the Txp, Tx, Rx, or ACK segments of connection scheduling. The unexpected signal is received from a wireless node in another link.

In a first example, assume that $N_A$ does not have data 860 to transmit to $N_B$ and therefore does not transmit in the Txp phase 854. $N_B$ also does not transmit in the Txp phase 854 because $N_B$ does not have transmit priority. If $N_C$ transmits in the Txp phase 854 and $N_A$ receives the Txp transmission 854, $N_A$ will determine that there is another node other than $N_B$ using its resource and will therefore detect a CID collision.

In a second example, assume that both $N_A$ and $N_C$ do not have data 860 to transmit and therefore do not transmit in the Txp phase 854, $N_B$ does not have data 860 to transmit and therefore does not transmit in the Tx phase 856, and $N_D$ has data 860 to transmit and transmits in the Tx phase 856. If $N_B$ receives the Tx transmission 856, $N_B$ will determine there is another node other than $N_A$ using its resource and will therefore detect a CID collision.

In a third example, assume that both $N_A$ and $N_C$ do not have data 860 to transmit and therefore do not transmit in the Txp phase 854, $N_B$ does not have data 860 to transmit and therefore does not transmit in the Tx phase 856, $N_D$ has data 860 to transmit and transmits in the Tx phase 856, $N_B$ does not receive the Tx transmission 856 by $N_D$, and $N_C$ transmits in the Rx phase 858 in response to the Tx transmission 856 by $N_D$. If either $N_A$ or $N_B$ receives the Rx transmission 858 by $N_C$, the wireless node will determine there is another node in another link using its resource and will therefore detect a CID collision.

In a fourth example, assume that both $N_A$ and $N_C$ do not have data 860 to transmit and therefore do not transmit in the Txp phase 854, $N_B$ does not have data 860 to transmit and therefore does not transmit in the Tx phase 856, and $N_D$ has data to transmit and transmits in the Tx phase 856. If $N_A$ receives the Tx transmission 856 from $N_D$, $N_A$ may believe that the Tx transmission 856 was from $N_B$. If $N_A$ determines to Rx yield and therefore not transmit in the Rx phase 858 to $N_B$, $N_C$ transmits in the Rx phase 858 in response to the Tx transmission 856 by $N_D$, and $N_A$ receives the Rx transmission 858, $N_A$ will determine that there is another node other than $N_B$ using its resource and will therefore detect a CID collision.

In a fifth example, assume that $N_A$ and $N_B$ have no data to transmit or otherwise one of them Rx or Tx yields such that neither $N_A$ nor $N_B$ transmits data 860. If either $N_A$ or $N_B$ receives a HARQ-ACK/NACK 862 transmitted from $N_C$ or $N_D$, the wireless node will determine that there is another node in another link using its resource and will therefore detect a CID collision.

The five examples provided supra are not exhaustive, as there are additional possibilities for a wireless node to detect a CID collision when the wireless node receives an unexpected signal in the Txp, Tx, Rx, or ACK segments of connection scheduling. The exemplary method provides wireless nodes in a link with the ability to detect a CID collision within as little as one frame, which corresponds to about 2 ms, and therefore is faster than the one second CID detection through the CID broadcast. Upon detecting a CID collision, a wireless node may propose a temporary CID for use until the next CID broadcast. In the next CID broadcast, a new CID is selected to replace the temporary CID.

As discussed supra, a wireless node detects a CID collision when the wireless node receives an unexpected signal in the Txp, Tx, Rx, or ACK segments of connection scheduling. In one configuration, if a wireless node receives an unexpected signal in the Txp, Tx, Rx, or ACK segments of connection scheduling, the wireless node determines whether the energy received on the unexpected signal is greater than a threshold. In such a configuration, the wireless node determines that there is a CID collision only if the energy received on the unexpected signal is greater than the threshold. The threshold may be adjusted such that links do not detect a CID collision with other links that are using the same CID if the other links would not cause significant interference to the peer-to-peer communications.

Figure 9:
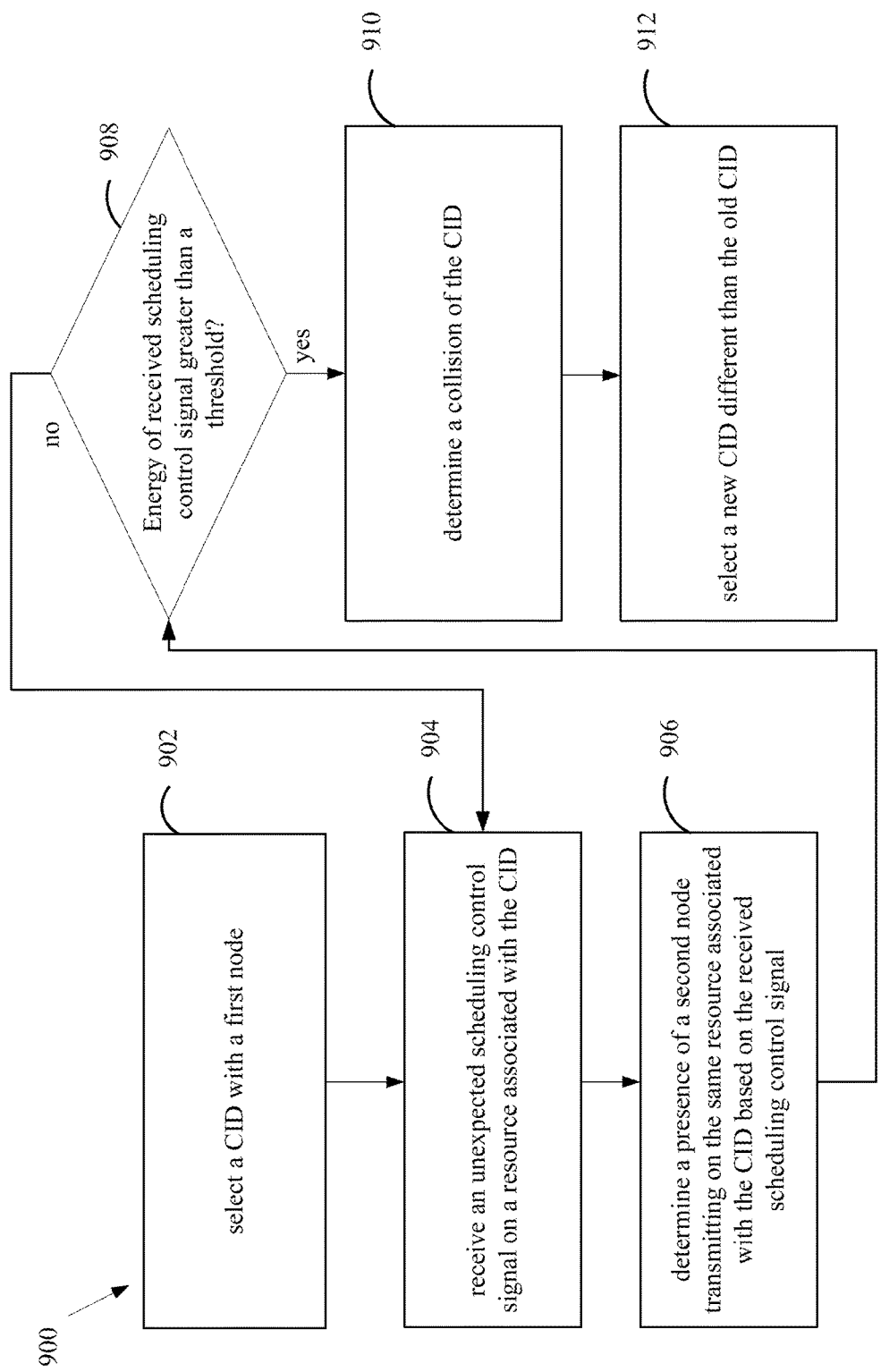
FIG. 9 is a flow chart of a method of wireless communication.

FIG. 9 is a flow chart 900 of an exemplary method. The method is performed by a wireless device in peer-to-peer communication with a first node. As shown in FIG. 9, the wireless device selects a CID with a first node (902). The wireless device then receives an unexpected scheduling control signal (e.g., Txp, Tx, or Rx) on a resource associated with the CID (904). The wireless device then determines a presence of a second node transmitting on the same resource associated with the CID based on the received scheduling control signal (906). In one configuration, the wireless device determines if an energy of the received scheduling control signal is greater than a threshold (908). If the energy of the received scheduling control signal is not greater than a threshold (908), the wireless device continues to listen for unexpected scheduling control signals on the resource associated with the CID (904). If the energy of the received scheduling control signal is greater than a threshold (908), the wireless device determines a collision of the CID (910). Upon determining the collision of the CID, the wireless device selects a new CID different than the old CID (912).

As discussed supra, the wireless device may determine the collision of the CID based on an energy of the received scheduling control signal being greater than a threshold. The wireless device may determine the collision of the CID by determining whether the energy of the received scheduling control signal is greater than the threshold, and determining the collision of the CID when the energy is determined to be greater than the threshold.

In one configuration, the wireless device that has transmit priority notifies the first node of an intention not to transmit by not transmitting in the Txp phase. In such a configuration, the wireless device receives from the second node an intention to transmit (i.e., the scheduling control signal is a Txp transmission received from the second node). The intention to transmit is communicated by transmitting on the resource and the intention not to transmit is communicated by not transmitting on the resource. In one configuration, the wireless device that does not have transmit priority (and therefore listens for a signal in the Txp phase from the first node) receives from the first node an intention not to transmit (i.e., the wireless device receives no signal in the Txp phase from the first node). In such a configuration, the wireless device determines not to transmit a transmission request (i.e., Tx transmission) to the first node and receives from the second node a transmission request (i.e., the scheduling control signal is a Tx transmission received from the second node). In one configuration, the wireless device does not transmit a transmission request (i.e., Tx transmission) to the first node and receives from the second node a transmission request response (i.e., the scheduling control signal is a Rx transmission received from the second node).

Figure 10:
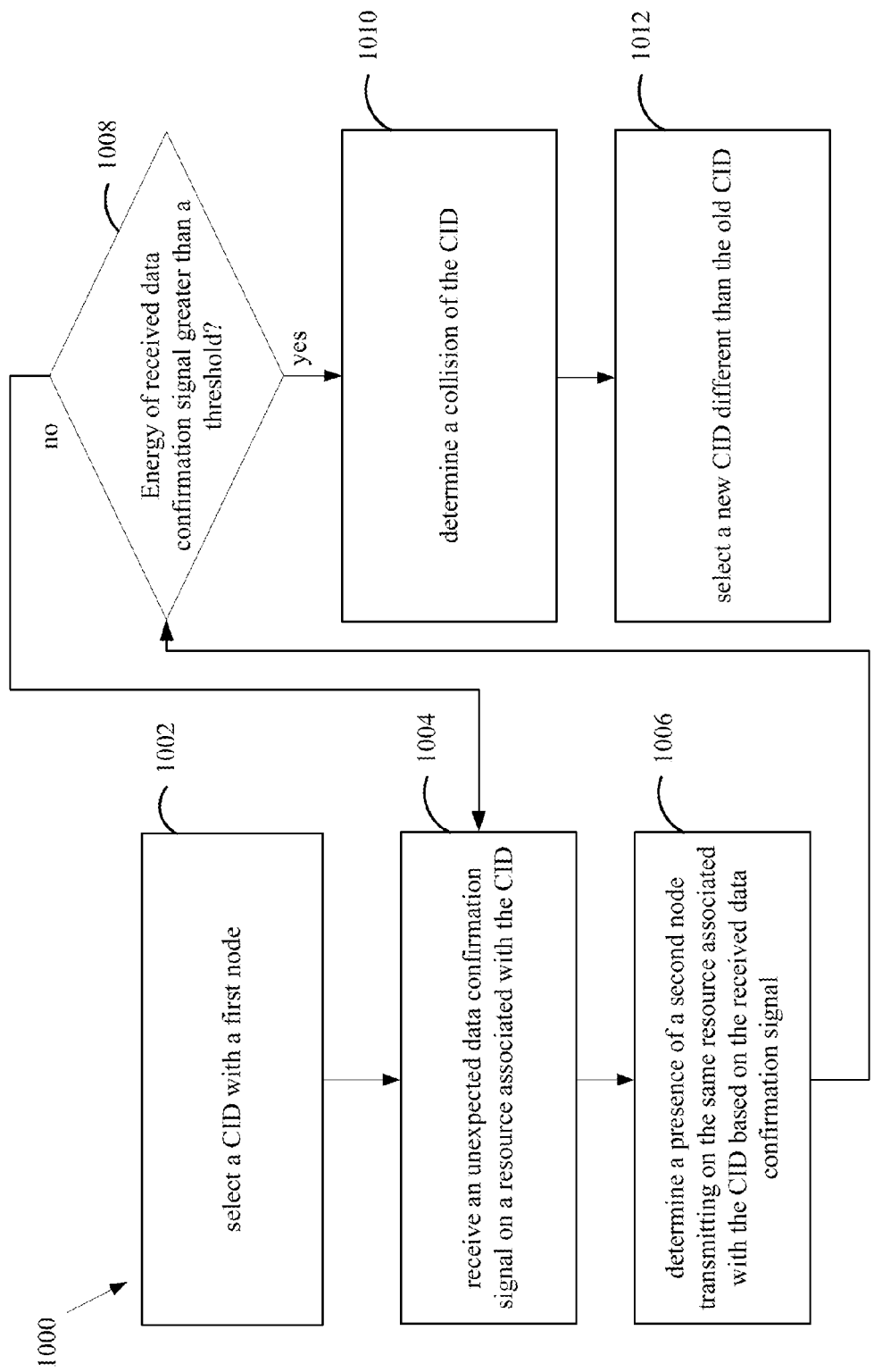
FIG. 10 is a flow chart of another method of wireless communication.

FIG. 10 is a flow chart 1000 of an exemplary method. The method is performed by a wireless device in peer-to-peer communication with a first node. As shown in FIG. 10, the wireless device selects a CID with a first node (1002). The wireless device then receives an unexpected data confirmation signal (e.g., HARQ-ACK/NACK) on a resource associated with the CID (1004). The wireless device then determines a presence of a second node transmitting on the same resource associated with the CID based on the received data confirmation signal (1006). In one configuration, the wireless device determines if an energy of the received data confirmation signal is greater than a threshold (1008). If the energy of the received data confirmation signal is not greater than a threshold (1008), the wireless device continues to listen for unexpected data confirmation signals on the resource associated with the CID (1004). If the energy of the received data confirmation signal is greater than a threshold (1008), the wireless device determines a collision of the CID (1010). Upon determining the collision of the CID, the wireless device selects a new CID different than the old CID (1012). In one configuration, the wireless device does not receive or transmit data and the received data confirmation signal is an HARQ-ACK/NACK.

Figure 11:
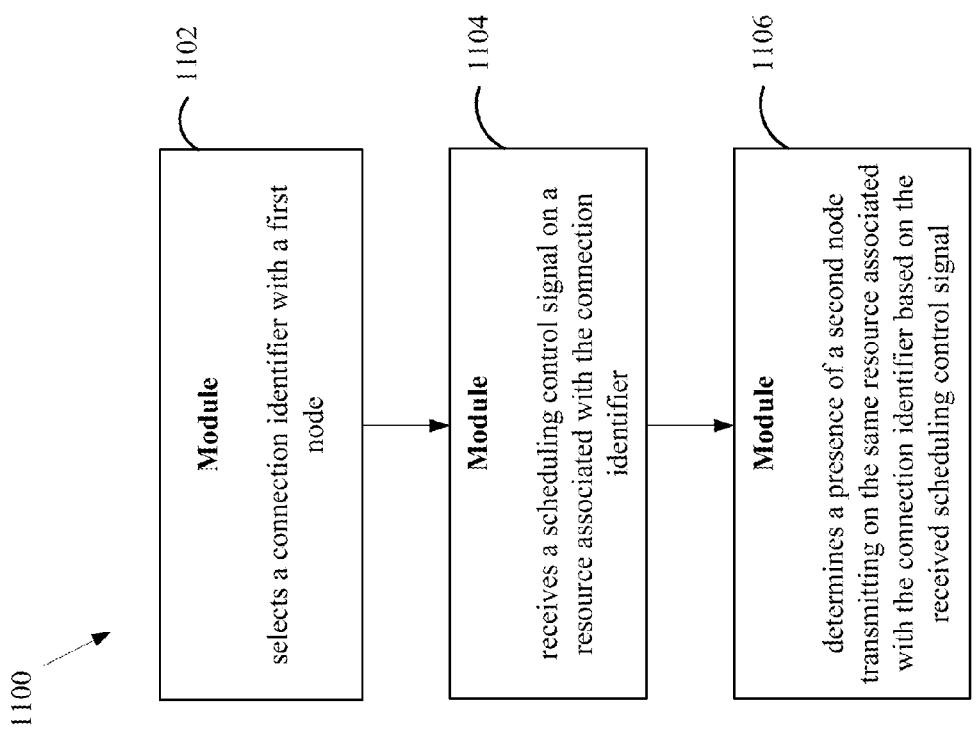
FIG. 11 is a conceptual block diagram illustrating the functionality of an exemplary apparatus.

FIG. 11 is a conceptual block diagram 1100 illustrating the functionality of an exemplary apparatus 100. The apparatus 100 includes a module 1102 that selects a CID with a first node. In addition, the apparatus 100 includes a module 1104 that receives a scheduling control signal on a resource associated with the CID. Furthermore, the apparatus 100 includes a module 1106 that determines a presence of a second node transmitting on the same resource associated with the CID based on the received scheduling control signal.

Figure 12:
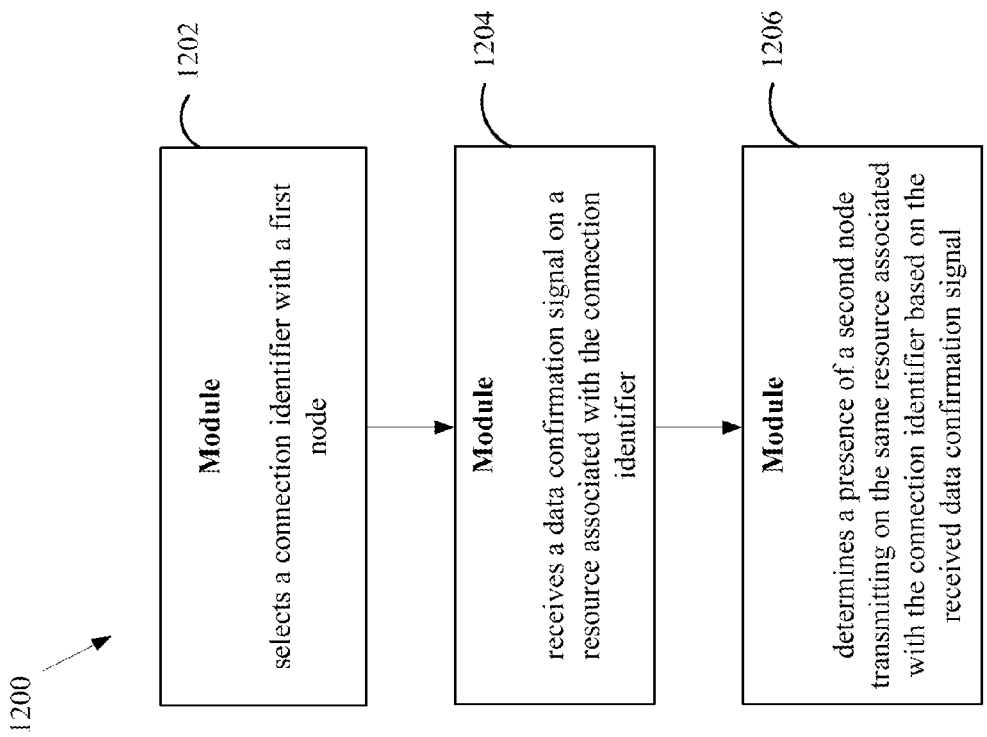
FIG. 12 is a conceptual block diagram illustrating the functionality of another exemplary apparatus.

FIG. 12 is a conceptual block diagram 1200 illustrating the functionality of an exemplary apparatus 100. The apparatus 100 includes a module 1202 that selects a CID with a first node. In addition, the apparatus 100 includes a module 1204 that receives a data confirmation signal on a resource associated with the CID. Furthermore, the apparatus 100 includes a module 1106 that determines a presence of a second node transmitting on the same resource associated with the CID based on the received data confirmation signal.

Referring to FIG. 1, in one configuration, the apparatus 100 for wireless communication includes means for selecting a connection identifier with a first node, means for receiving a scheduling control signal on a resource associated with the connection identifier, and means for determining a presence of a second node transmitting on the same resource associated with the connection identifier based on the received scheduling control signal. In one configuration, the apparatus 100 further includes means for determining a collision of the connection identifier upon determining the presence of the second node transmitting on the same resource associated with the connection identifier. In one configuration, the apparatus 100 further includes means for selecting a new connection identifier different than said connection identifier upon determining the collision of the connection identifier. In one configuration, the means for determining the collision of the connection identifier makes the determination based on an energy of the received scheduling control signal being greater than a threshold. In one configuration, the means for determining the collision of the connection identifier includes means for determining whether an energy of the received scheduling control signal is greater than the threshold, and means for determining the collision of the connection identifier when the energy is determined to be greater than the threshold. In one configuration, the apparatus 100 further includes means for notifying the first node of an intention not to transmit. In one configuration, the apparatus 100 further includes means for receiving from the first node an intention not to transmit, and means for determining not to transmit a transmission request to the first node. In one configuration, the apparatus 100 further includes means for not transmitting a transmission request to the first node. The aforementioned means is the processing system 114 configured to perform the functions recited by the aforementioned means.

In another configuration, the apparatus 100 for wireless communication includes means for selecting a connection identifier with a first node, means for receiving a data confirmation signal on a resource associated with the connection identifier, and means for determining a presence of a second node transmitting on the same resource associated with the connection identifier based on the received data confirmation signal. In one configuration, the apparatus 100 further includes means for not receiving or transmitting data. In one configuration, the apparatus 100 further includes means for determining a collision of the connection identifier upon determining the presence of the second node transmitting on the same resource associated with the connection identifier. In one configuration, the apparatus 100 further includes means for selecting a new connection identifier different than said connection identifier upon determining the collision of the connection identifier. In one configuration, the means for determining the collision of the connection identifier includes means for determining whether an energy of the data confirmation signal is greater than the threshold, and means for determining the collision of the connection identifier when the energy is determined to be greater than the threshold. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of operating a wireless device, comprising:
   selecting a connection identifier with a first node that identifies a link between the wireless device and the first node;
   receiving a scheduling control signal on an allocated resource element associated with the connection identifier, wherein the connection identifier is associated with a set of resources that includes a transmit priority block, a transmit request block, and a receive request block, and wherein the transmit priority block is designated for one of the wireless device or the first node having transmit priority in the link and indicates whether the wireless device or the first node will act as a transmitter or a receiver, the transmit request block is used by the wireless device or the first node to make a request to schedule a data transmission, and the receive request block is used by the wireless device or the first node to indicate an intention to act as a receiver in the link; and
   determining a presence of a second node transmitting on the same allocated resource element associated with one of the transmit priority block, the transmit request block, or the receive request block and with the connection identifier based on the received scheduling control signal, wherein the scheduling control signal is for scheduling the data transmission with the second node and is received on the allocated resource element in the transmit priority block, the transmit request block, or the receive request block.

2. The method of claim 1, further comprising determining a collision of the connection identifier upon determining the presence of the second node transmitting on the same allocated resource element associated with the connection identifier.

3. The method of claim 2, further comprising selecting a new connection identifier different than said connection identifier upon determining the collision of the connection identifier.

4. The method of claim 2, wherein the determining the collision of the connection identifier is based on an energy of the received scheduling control signal being greater than a threshold.

5. The method of claim 4, wherein the determining the collision of the connection identifier comprises:
   determining whether an energy of the received scheduling control signal is greater than the threshold; and
   determining the collision of the connection identifier when the energy is determined to be greater than the threshold.

6. The method of claim 1, further comprising notifying the first node of an intention not to transmit, wherein the receiving the scheduling control signal comprises receiving from the second node an intention to transmit.

7. The method of claim 6, wherein the intention not to transmit is communicated by not transmitting on the same allocated resource element and the intention to transmit is communicated by transmitting on the same allocated resource element.

8. The method of claim 1, further comprising:
   receiving from the first node an intention not to transmit; and
   determining not to transmit a transmission request to the first node,
   wherein the receiving the scheduling control signal comprises receiving from the second node a transmission request.

9. The method of claim 1, further comprising not transmitting a transmission request to the first node, wherein the receiving the scheduling control signal comprises receiving from the second node a transmission request response.

10. An apparatus for wireless communication, comprising:
    means for selecting a connection identifier with a first node that identifies a link between the apparatus and the first node;
    means for receiving a scheduling control signal on an allocated resource element associated with the connection identifier, wherein the connection identifier is associated with a set of resources that includes a transmit priority block, a transmit request block, and a receive request block, and wherein the transmit priority block is designated for one of the apparatus or the first node having transmit priority in the link and indicates whether the apparatus or the first node will act as a transmitter or a receiver, the transmit request block is used by the apparatus or the first node to make a request to schedule a data transmission, and the receive request block is used by the apparatus or the first node to indicate an intention to act as a receiver in the link; and
    means for determining a presence of a second node transmitting on the same allocated resource element associated with one of the transmit priority block, the transmit request block, or the receive request block and with the connection identifier based on the received scheduling control signal, wherein the scheduling control signal is for scheduling the data transmission with the second node and is received on the allocated resource element in the transmit priority block, the transmit request block, or the receive request block.

11. The apparatus of claim 10, further comprising means for determining a collision of the connection identifier upon determining the presence of the second node transmitting on the same allocated resource element associated with the connection identifier.

12. The apparatus of claim 11, further comprising means for selecting a new connection identifier different than said connection identifier upon determining the collision of the connection identifier.

13. The apparatus of claim 11, wherein the means for determining the collision of the connection identifier makes the determination based on an energy of the received scheduling control signal being greater than a threshold.

14. The apparatus of claim 13, wherein the means for determining the collision of the connection identifier comprises:
  means for determining whether an energy of the received scheduling control signal is greater than the threshold; and
  means for determining the collision of the connection identifier when the energy is determined to be greater than the threshold.

15. The apparatus of claim 10, further comprising means for notifying the first node of an intention not to transmit, wherein the means for receiving the scheduling control signal receives from the second node an intention to transmit.

16. The apparatus of claim 15, wherein the intention not to transmit is communicated by not transmitting on the same allocated resource element and the intention to transmit is communicated by transmitting on the same allocated resource element.

17. The apparatus of claim 10, further comprising:
  means for receiving from the first node an intention not to transmit; and
  means for determining not to transmit a transmission request to the first node,
  wherein the means for receiving the scheduling control signal receives from the second node a transmission request.

18. The apparatus of claim 10, further comprising means for not transmitting a transmission request to the first node, wherein the means for receiving the scheduling control signal receives from the second node a transmission request response.

19. A non-transitory computer-readable medium of a wireless device storing computer executable code, comprising code for:
  selecting a connection identifier with a first node that identifies a link between the wireless device and the first node;
  receiving a scheduling control signal on an allocated resource element associated with the connection identifier, wherein the connection identifier is associated with a set of resources that includes a transmit priority block, a transmit request block, and a receive request block, and wherein the transmit priority block is designated for one of the wireless device or the first node having transmit priority in the link and indicates whether the wireless device or the first node will act as a transmitter or a receiver, the transmit request block is used by the wireless device or the first node to make a request to schedule a data transmission, and the receive request block is used by the wireless device or the first node to indicate an intention to act as a receiver in the link; and
  determining a presence of a second node transmitting on the same allocated resource element associated with one of the transmit priority block, the transmit request block, or the receive request block and with the connection identifier based on the received scheduling control signal, wherein the scheduling control signal is for scheduling the data transmission with the second node and is received on the allocated resource element in the transmit priority block, the transmit request block, or the receive request block.

20. The non-transitory computer-readable medium of claim 19, further comprising code for determining a collision of the connection identifier upon determining the presence of the second node transmitting on the same allocated resource element associated with the connection identifier.

21. The non-transitory computer-readable medium of claim 20, further comprising code for selecting a new connection identifier different than said connection identifier upon determining the collision of the connection identifier.

22. The non-transitory computer-readable medium of claim 20, wherein the code for determining the collision of the connection identifier makes the determination based on an energy of the received scheduling control signal being greater than a threshold.

23. The non-transitory computer-readable medium of claim 22, wherein the code for determining the collision of the connection identifier comprises code for:
  determining whether an energy of the received scheduling control signal is greater than the threshold; and
  determining the collision of the connection identifier when the energy is determined to be greater than the threshold.

24. The non-transitory computer-readable medium of claim 19, further comprising code for notifying the first node of an intention not to transmit, wherein the code for receiving the scheduling control signal comprises code for receiving from the second node an intention to transmit.

25. The non-transitory computer-readable medium of claim 24, wherein the intention not to transmit is communicated by not transmitting on the same allocated resource element and the intention to transmit is communicated by transmitting on the same allocated resource element.

26. The non-transitory computer-readable medium of claim 19, further comprising code for:
  receiving from the first node an intention not to transmit; and
  determining not to transmit a transmission request to the first node,
  wherein the code for receiving the scheduling control signal comprises code for receiving from the second node a transmission request.

27. The non-transitory computer-readable medium of claim 19, further comprising code for not transmitting a transmission request to the first node, wherein the code for receiving the scheduling control signal comprises code for receiving from the second node a transmission request response.

28. An apparatus for wireless communication, comprising:
  a processing system configured to:
  select a connection identifier with a first node that identifies a link between the apparatus and the first node;
  receive a scheduling control signal on an allocated resource element associated with the connection identifier, wherein the connection identifier is associated with a set of resources that includes a transmit priority block, a transmit request block, and a receive request block, and wherein the transmit priority block is designated for one of the apparatus or the first node having transmit priority in the link and indicates whether the apparatus or the first node will act as a transmitter or a receiver, the transmit request block is used by the apparatus or the first node to make a request to schedule a data transmission, and the receive request block is used by the apparatus or the first node to indicate an intention to act as a receiver in the link; and
  determine a presence of a second node transmitting on the same allocated resource element associated with one of the transmit priority block, the transmit request block, or the receive request block and with the connection identifier based on the received scheduling control signal, wherein the scheduling control signal is for scheduling the data transmission with the second node and is received on the allocated resource element in the transmit priority block, the transmit request block, or the receive request block.

29. The apparatus of claim 28, wherein the processing system is further configured to determine a collision of the connection identifier upon determining the presence of the second node transmitting on the same allocated resource element associated with the connection identifier.

30. The apparatus of claim 29, wherein the processing system is further configured to select a new connection identifier different than said connection identifier upon determining the collision of the connection identifier.

31. The apparatus of claim 29, wherein to determine the collision of the connection identifier, the processing system is configured to make the determination based on an energy of the received scheduling control signal being greater than a threshold.

32. The apparatus of claim 31, wherein to determine the collision of the connection identifier, the processing system is configured to:
determine whether an energy of the received scheduling control signal is greater than the threshold; and
determine the collision of the connection identifier when the energy is determined to be greater than the threshold.

33. The apparatus of claim 28, wherein the processing system is further configured to notify the first node of an intention not to transmit, wherein to receive the scheduling control signal, the processing system is configured to receive from the second node an intention to transmit.

34. The apparatus of claim 33, wherein the intention not to transmit is communicated by not transmitting on the same allocated resource element and the intention to transmit is communicated by transmitting on the same allocated resource element.

35. The apparatus of claim 28, wherein the processing system is further configured to:
receive from the first node an intention not to transmit; and
determine not to transmit a transmission request to the first node,
wherein to receive the scheduling control signal, the processing system is configured to receive from the second node a transmission request.

36. The apparatus of claim 28, wherein the processing system is further configured not to transmit a transmission request to the first node, wherein to receive the scheduling control signal, the processing system is configured to receive from the second node a transmission request response.

37. The method of claim 1, wherein the connection identifier is selected during a connection identifier broadcast interval, and the scheduling control signal is received during a connection scheduling interval different from the connection identifier broadcast interval.

* * * * *